United States Patent
Nakamura

(10) Patent No.: US 10,430,130 B2
(45) Date of Patent: Oct. 1, 2019

(54) INFORMATION PROCESSING SYSTEM, INFORMATION PROCESSING METHOD

(71) Applicant: Mitsuo Nakamura, Kanagawa (JP)

(72) Inventor: Mitsuo Nakamura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/914,010

(22) Filed: Mar. 7, 2018

(65) Prior Publication Data

US 2018/0260172 A1 Sep. 13, 2018

(30) Foreign Application Priority Data

Mar. 10, 2017 (JP) .................. 2017-046377

(51) Int. Cl.
| | |
|---|---|
| *G06F 3/12* | (2006.01) |
| *G06K 15/02* | (2006.01) |
| *G06F 8/65* | (2018.01) |
| *H04N 1/00* | (2006.01) |
| *H04L 29/08* | (2006.01) |
| *H04L 12/24* | (2006.01) |

(52) U.S. Cl.
CPC .......... *G06F 3/1225* (2013.01); *G06F 3/1203* (2013.01); *G06F 3/1285* (2013.01); *G06F 8/65* (2013.01); *H04L 41/0806* (2013.01); *H04L 41/0893* (2013.01); *H04L 67/34* (2013.01); *H04N 1/00503* (2013.01); *H04N 1/00941* (2013.01); *H04L 41/082* (2013.01); *H04L 67/02* (2013.01)

(58) Field of Classification Search
None
See application file for complete search history.

(56) References Cited

U.S. PATENT DOCUMENTS

| | | | | |
|---|---|---|---|---|
| 9,092,296 | B1* | 7/2015 | Nay ................... | G06F 8/654 |
| 9,529,579 | B2* | 12/2016 | Brunet ................ | G06F 8/65 |
| 2004/0075857 | A1* | 4/2004 | Akiyoshi ............. | G06F 8/61 |
| | | | | 358/1.13 |
| 2006/0033950 | A1 | 2/2006 | Nakamura | |

(Continued)

FOREIGN PATENT DOCUMENTS

| | | |
|---|---|---|
| JP | 2008-165654 | 7/2008 |
| JP | 2014-232512 | 12/2014 |
| JP | 2016-115285 | 6/2016 |

*Primary Examiner* — Beniyam Menberu
(74) *Attorney, Agent, or Firm* — Oblon, McClelland, Maier & Neustadt, L.L.P.

(57) ABSTRACT

An information processing system includes an image forming apparatus and a server that provides application information of at least one web application to the image forming apparatus. The system includes a memory to store the application information of the web application; and circuitry to receive a selection of a specific web application by a user, compare device information of the image forming apparatus with application information of the selected web application, determine whether an update of firmware of the image forming apparatus is necessary based on a result of the comparison, update the firmware when a result of the determination indicates that the update of the firmware is necessary, generate a shortcut icon of the selected web application after the firmware is updated, and execute the selected web application, which required the update of the firmware of the image forming apparatus, by using the shortcut icon.

8 Claims, 16 Drawing Sheets

(56) References Cited

U.S. PATENT DOCUMENTS

| | | | |
|---|---|---|---|
| 2006/0184929 A1* | 8/2006 | Ohtsuka | G06F 8/65 |
| | | | 717/168 |
| 2007/0058195 A1 | 3/2007 | Nakamura et al. | |
| 2008/0040767 A1* | 2/2008 | McCarthy | H04N 7/17318 |
| | | | 725/132 |
| 2008/0120394 A1 | 5/2008 | Yokoyama et al. | |
| 2008/0195590 A1 | 8/2008 | Nakamura et al. | |
| 2009/0051952 A1 | 2/2009 | Abe et al. | |
| 2011/0016464 A1 | 1/2011 | Tamura et al. | |
| 2011/0161652 A1 | 6/2011 | Ogura et al. | |
| 2012/0036442 A1* | 2/2012 | Dare | G06F 8/60 |
| | | | 715/736 |
| 2012/0180034 A1* | 7/2012 | Hatamoto | G06F 8/65 |
| | | | 717/168 |
| 2013/0125054 A1* | 5/2013 | Sato | H04N 1/00411 |
| | | | 715/810 |
| 2014/0115539 A1* | 4/2014 | Chou | G06F 3/0481 |
| | | | 715/835 |
| 2014/0282480 A1* | 9/2014 | Matthew | G06F 8/60 |
| | | | 717/172 |
| 2014/0355049 A1 | 12/2014 | Hadano | |
| 2015/0012913 A1* | 1/2015 | Jin | G06F 8/61 |
| | | | 717/170 |
| 2015/0188609 A1* | 7/2015 | Inoue | H04B 5/0037 |
| | | | 455/41.1 |
| 2015/0288748 A1* | 10/2015 | Oh | G06Q 10/10 |
| | | | 709/203 |
| 2016/0062760 A1* | 3/2016 | Zhang | G06F 8/65 |
| | | | 717/170 |
| 2016/0147483 A1 | 5/2016 | Nakamura | |
| 2016/0182610 A1* | 6/2016 | Satoh | H04L 67/06 |
| | | | 709/219 |
| 2018/0063700 A1* | 3/2018 | Chandrasekaran | H04W 8/205 |

* cited by examiner

```
┌─────51
│ HTTP Request Header
│
│ GET / HTTP/1.1
│ Accept: image/gif, image/jpeg, */*
│ Accept-Languag: ja
│ Accept-Encoding: gzip, deflate
│ User-Agent: Mozilla/4.0 (Compatible. MSIE 6.0; Windows NT 5.1;) }~52
│ Host: www.xxx.zzz
│ Connection: Keep-Alive
```

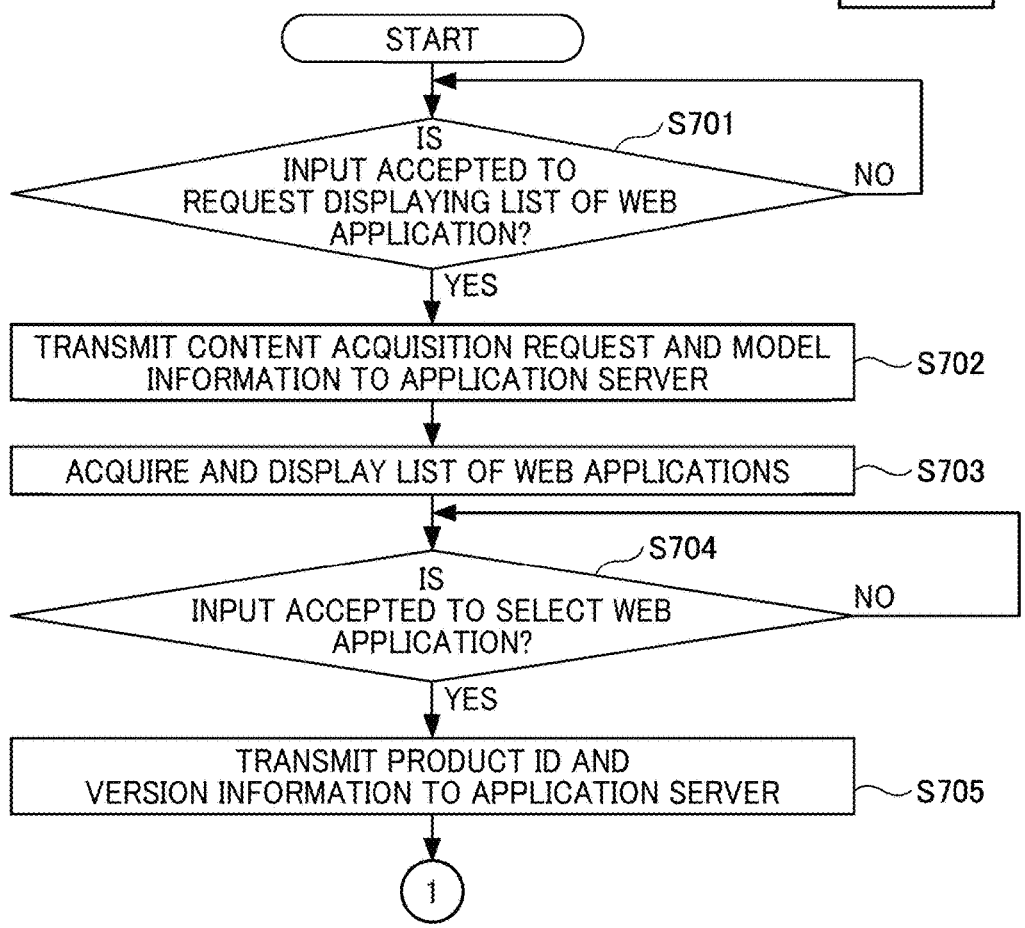

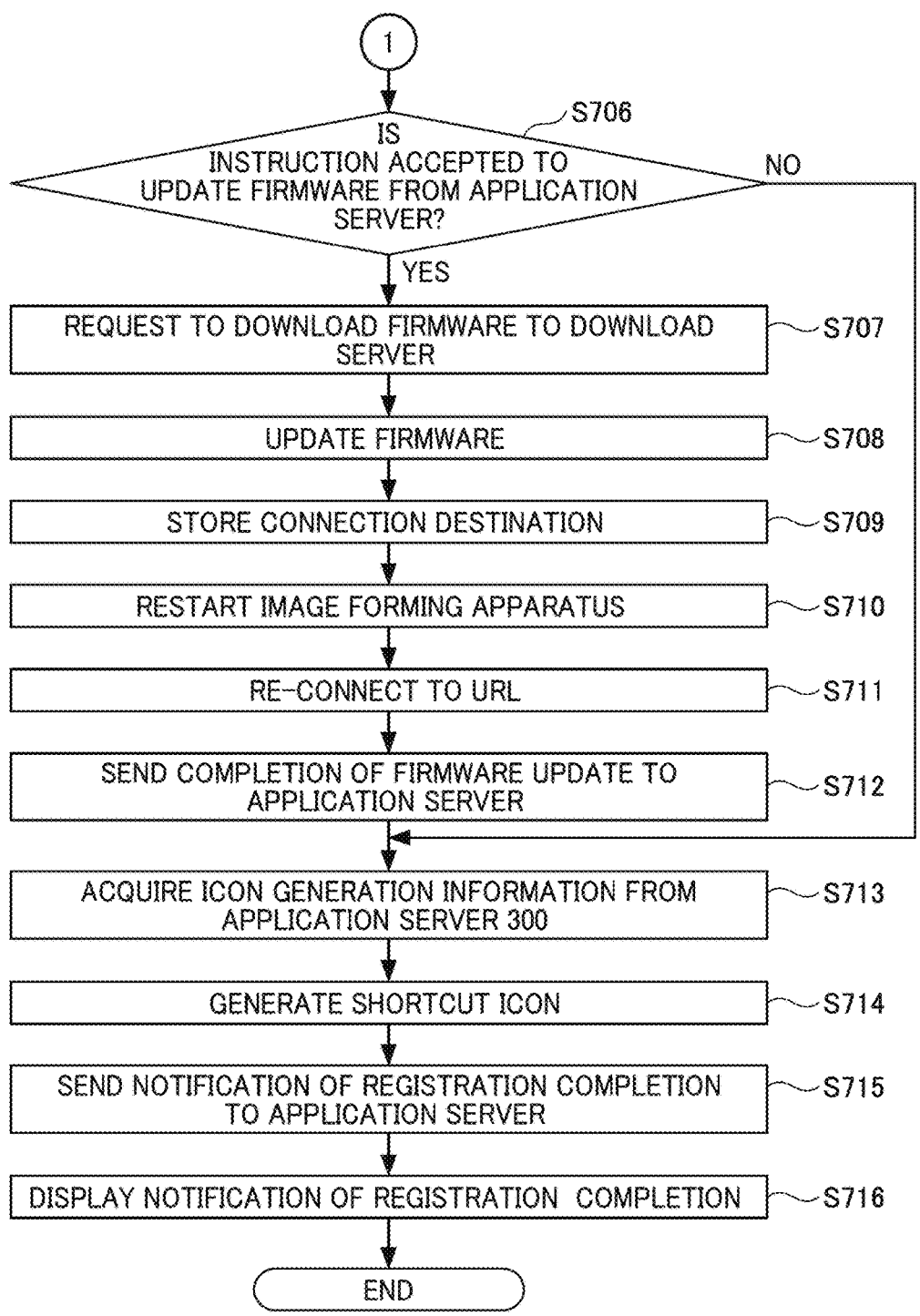

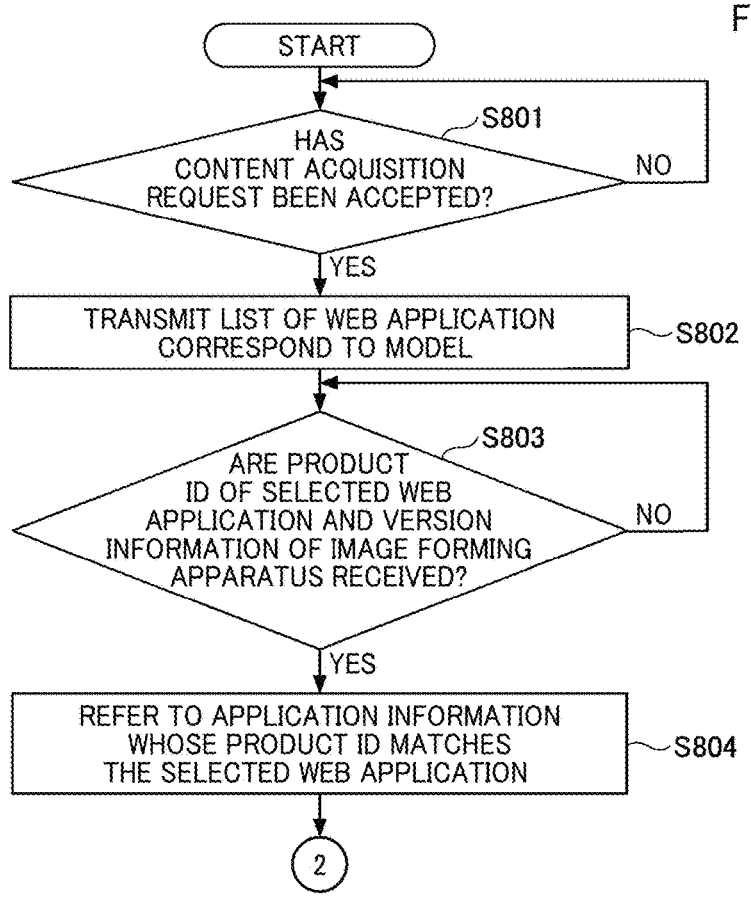

INFORMATION PROCESSING SYSTEM, INFORMATION PROCESSING METHOD

CROSS-REFERENCE TO RELATED APPLICATIONS

The present application is based upon and claims the benefit of priority of Japanese Patent Application No. 2017-046377, filed on Mar. 10, 2017, the contents of which are incorporated herein by reference in their entirety.

BACKGROUND

1. Field

The present disclosure relates to an information processing system, and an information processing method.

2. Description of the Related Art

In conventional electronic devices, such as an image forming apparatus, it is known that functions can be added by installing software applications. Further, it is also known that, conventional electronic devices determine whether or not a function can be added by installing a software application (hereinafter said as an "application"), based on information included in the package of the application, such as an API (Application Program Interface) version, etc. Specifically, for example, a technique is known that a computer device allows downloading of a selected application only when the selected application can be used (supported) by the computer device.

Furthermore, according to the related art in Japanese Laid-Open Patent Publication No. 2016-115285, by the determination based on information such as a version, the application to be added can be used for only the electronic device that is after a specific version. Further, if the electronic device is before earlier than the specific version, the firmware (managing the version) in the electronic device can be updated automatically.

However a Web application is different from an application installed in the electronic device. When the electronic device adds a function by the Web application, a user can use the Web application only by selecting a URL of the Web application on the Web browser. Therefore, even if the conventional art is used, the electronic device cannot acquire the version information included in the package and cannot determine whether or not the electronic device can add the function.

Therefore, even if the electronic device adds the function that can be used in the specific software version of the electronic device and the actual software version of the electronic device is earlier, the electronic device cannot update the firmware automatically.

The present disclosure has been made in view of the above circumstances, and it is an object to facilitate construction (updating) of firmware in the electronic device relating to using a web application.

SUMMARY

In one aspect, the present disclosure relates to an information processing system including an image forming apparatus and a server that provides application information of at least one web application to the image forming apparatus, comprising: (1) a memory included in the server, to store the application information of the web application; and (2) circuitry configured to (a) receive a selection of a specific web application by a user, (b) compare device information of the image forming apparatus with application information of the selected web application, (c) determine whether an update of firmware of the image forming apparatus is necessary based on a result of the comparison, (d) update the firmware of the image forming apparatus when a result of the determination indicates that the update of the firmware is necessary, (e) generate a shortcut icon of the selected web application after the firmware is updated, and (f) execute the selected web application, which required the update of the firmware of the image forming apparatus, by using the shortcut icon.

In another aspect, the present disclosure is directed to a server, comprising: (1) a memory to store application information of at least one the web application; and (2) first circuitry configured to (a) receive device information of an image processing apparatus and receive an identifier identifying a selection of a specific web application of the image forming apparatus, (b) compare the received device information of the image forming apparatus with application information of the selected web application, the application information being obtained from the memory, (c) determine whether an update of firmware of the image forming apparatus is necessary, based on a result of the comparison, and (d) send, to the image forming apparatus, an instruction to update the firmware of the image forming apparatus, when a result of the determination indicates that the update of the firmware is necessary.

BRIEF DESCRIPTION OF THE DRAWINGS

FIG. 5 is a diagram showing an example of device information.

FIGS. 7A and 7B are flowcharts explaining an operation of the image forming apparatus.

FIGS. 8A and 8B are flowcharts explaining an operation of an application server.

DETAILED DESCRIPTION

Figure 1:
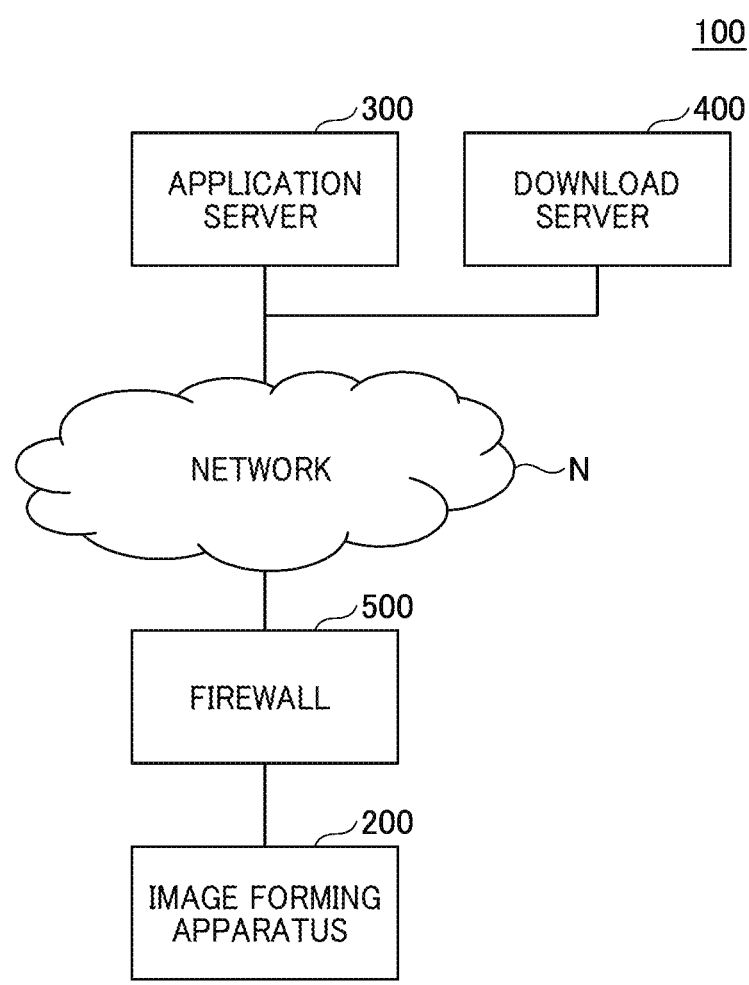
FIG. 1 is a diagram showing an example of a system configuration of an information processing system in an embodiment of the present disclosure.

An embodiment of the present disclosure is described below with reference to the drawings. FIG. 1 is a diagram showing an example of a system configuration of an information processing system in one embodiment.

The information processing system 100 in the present embodiment includes an image forming apparatus 200, an application server 300, and a download server 400. The image forming apparatus 200, the application server 300, and the download server 400 are connected via a network N.

In FIG. 1, the image forming apparatus 200 is connected to the network via the firewall 500 to improve confidentiality, but the present disclosure is not limited to this.

In the information processing system 100, the image forming apparatus 200 of the present embodiment executes data communication with the application server 300 and the download server 400 via the network N.

Further, in FIG. 1, the information processing system 100 includes one image forming apparatus 200, but the present disclosure is not limited to that. The information processing system 100 can include more than one image forming apparatuses 200.

In FIG. 1, the information processing system 100 includes the image forming apparatus 200, the application server 300, and the download server 400, but the present disclosure is not limited that. The information processing system 100 may have at least the image forming apparatus 200 and the application server 300.

The information processing system 100 in FIG. 1, the image forming apparatus 200 is included, but the information processing system 100 is not limited to that. The image forming apparatus 200 of the present embodiment is an example of an electronic apparatus. In the information processing system 100 of the present embodiment, the electronic device connected to the network is not limited to the image forming device 200, and any electronic device that can add a function that implemented by an application can be any kind of device. Examples of the device other than the image forming apparatus are a projector, a video conference system, an electronic blackboard, a digital camera, and the like. These electronic devices also can obtain the same effect by the inventions of the present disclosure, when the electronic devices includes firmware and implements certain functions using applications.

The image forming apparatus 200 in the present embodiment is a multifunction peripheral having a copy function, a facsimile function, a scanner function, and a printer function. Alternatively, a machine that has a single function, such as a copy machine, FAX, printer apparatus, and scanner apparatus, can be applied similarly.

The application server 300 in the present embodiment provides contents as a list of web applications to the image forming apparatus 200 in response to a request from the image forming apparatus 200. The web application in the present embodiment is an application program that operates by cooperation between a program operating on a web browser and a program on a web server side. The application program is used on a web browser included in the image forming apparatus 200.

The download server 400 provides the firmware to the image forming apparatus 200 by receiving a request from the image forming apparatus 200.

For example, the application server 300 and the download server 400 in the present embodiment can be included in a server group existing on the Internet and providing various services. Also, in FIG. 1, the application server 300 and the download server 400 in the present embodiment are described as independent servers, but the present disclosure is not limited to that. The application server 300 and the download server 400 can be included in a single server. Further, instead of a single server, a plurality of servers can be used collectively.

Further, in the present disclosure, the application supplied from the application server 300 can be an application other than the web application.

Figure 2:
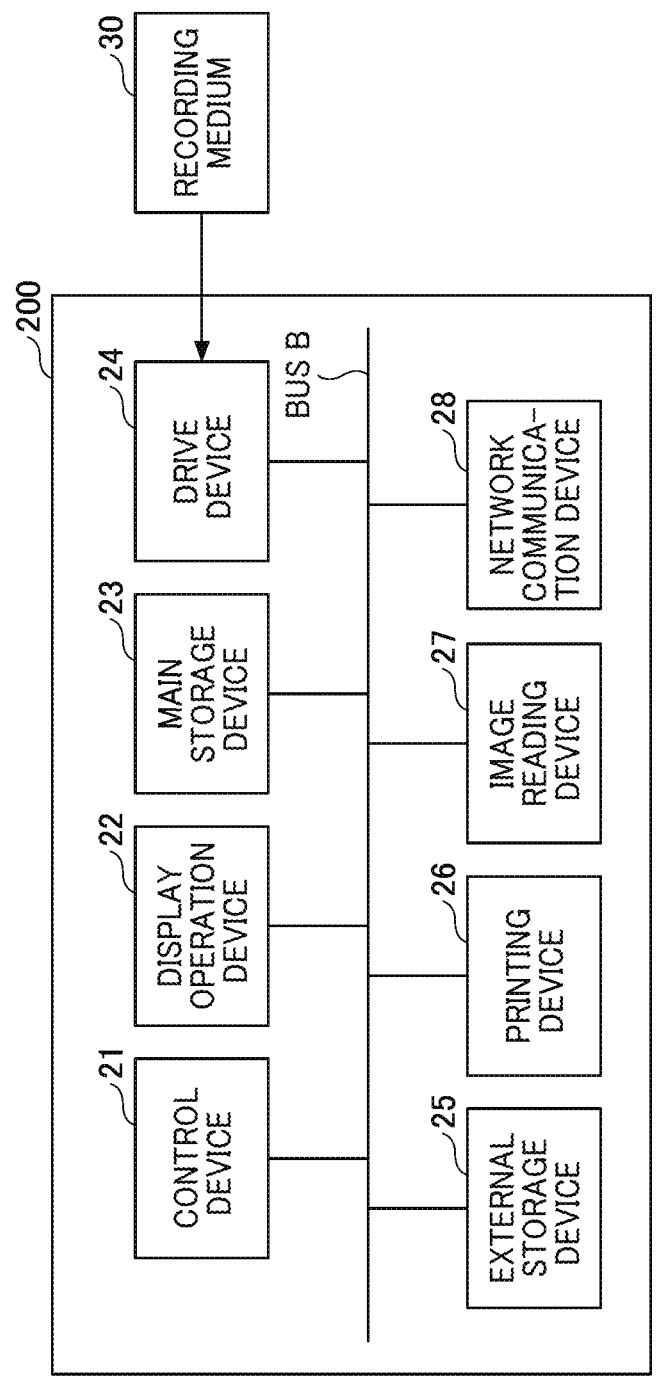
FIG. 2 is a diagram showing an example of a hardware configuration of an image forming apparatus.
Figure 3:
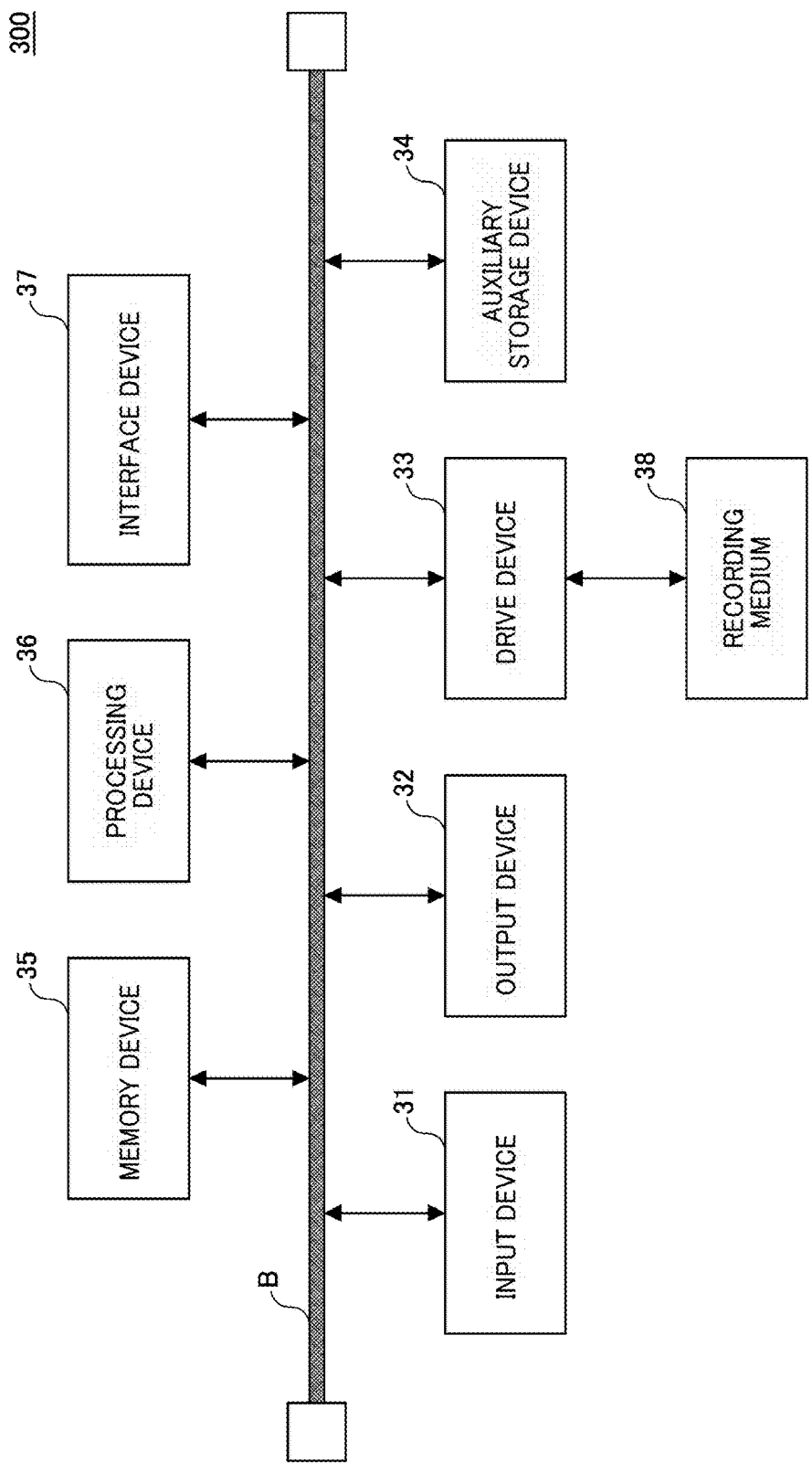
FIG. 3 is a diagram showing an example of a hardware configuration of an application server.

Next, with reference to FIGS. 2 and 3, hardware configurations of the image forming apparatus 200 and the application server 300 in the present embodiment will be described. FIG. 2 is a diagram showing an example of the hardware configuration of the image forming apparatus.

The image forming apparatus 200 in the present embodiment includes a control device 21, a display operation device 22, a main storage device (memory) 23, a drive device 24, an external storage device (memory) 25, a printing device 26, an image reading device 27, a network communication device 28. Each device in the image forming apparatus is connected via a bus B.

The control device 21 loads programs to be used from the external storage device 25 to the main storage device 23 and executes them. The control device 21 controls the entire image forming apparatus 200 through the bus B.

The display operation device 22 is implemented by a touch panel or the like, for example, and performs displaying of various kinds of information and reception of an operation instruction to control the image forming apparatus 200.

The main storage device 23 is, e.g., a RAM that functions as a work area of a program executed by the control device 21. The drive device 24 reads the application registration program stored in the recording medium 30 when the recording medium 30 is set, and stores it in the external storage device 25 or the like. The application registration program is a part of a program executed by the control device 21. The recording medium 30 can be various types of recording media, such as a recording medium that optically, electrically, or magnetically records information, e.g., a CD-ROM, a flexible disk, a magneto-optical disk, a ROM, a flash memory, or a semiconductor memory.

The external storage device 25 is, for example, a hard disk drive or the like, and stores various control programs, software application programs, image data, and the like.

The printing device 26 is an engine unit that performs image formation, and receive image data from an image reading device 27 or from an external personal computer, and, based on image data, forms and fixes an image on a recording medium, such as paper, and outputs it. The image reading device 27 is a scanner that reads an image from a document or the like to obtain image data.

The network device 28 is a communication device to connect the image forming apparatus 200 to the network N and to the application server 300 and the download server 400 via the network N. The application registration program downloaded from the network N is installed in the external storage device 25 via the network communication device 28.

Next, with reference to FIG. 3, the hardware configuration of the application server 300 in this embodiment will be described. FIG. 3 is a diagram showing an example of the hardware configuration of the application server.

The application server 300 in this embodiment is an example of an information processing device, and includes an input device 31, an output device 32, a drive device 33, an auxiliary storage device 34, a memory device 35, a processing device 36, and an interface device 37 all connected via the bus B.

The input device 31 inputs various types of information, for example, a request from the image forming apparatus 200 via the network N. The output device 32 outputs various kinds of information. The output device 32, for example, outputs Web content and a Web application including HTML, JavaScript, and CSS, and the like respectively, corresponding to the request from the image forming apparatus 200 or another electric device. The interface device 37 includes a modem, a LAN card, and the like, and is used to connect to the network N.

The drive device 33 is a driver to read the recording medium 38. When the recording medium 38 is set in the drive device 33, an update determination program stored in the recording medium 38 is read and send to the auxiliary storage device 34 for installing the update determination program. Further, the update determination program can be downloaded from the network N and installed in the auxiliary storage device 34 via the interface device 37.

The auxiliary storage device 34 stores the installed update determination program and necessary files, data, and the like. The memory device 35 reads and stores the update determination program from the auxiliary storage device 34 when the application server 300 is activated. The processing unit 36 implements various processes, as described below, according to the program stored in the memory device 35.

The hardware configuration of the download server 400 in the present embodiment is the same as the application server 300, so its description is omitted.

Figure 4A:
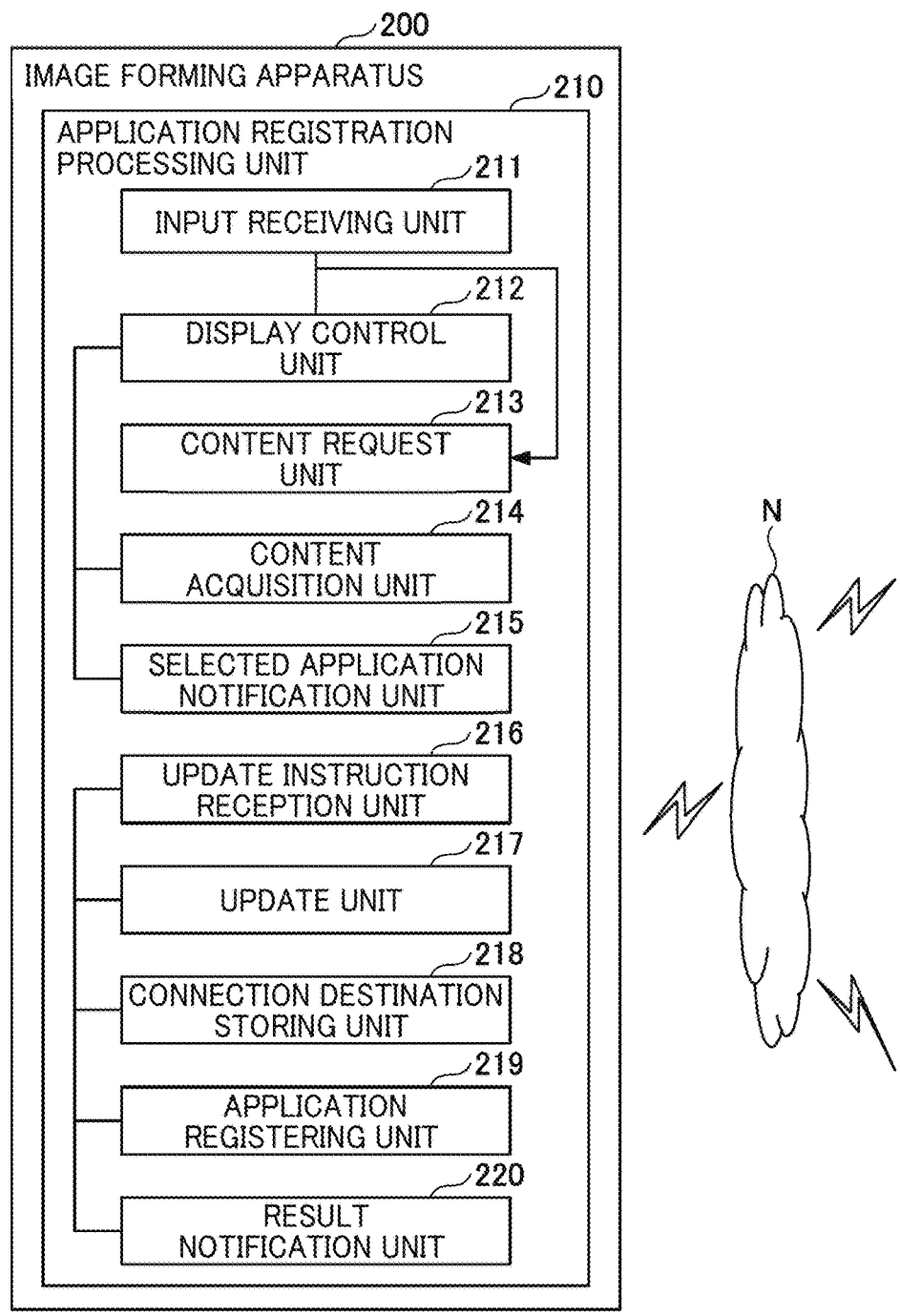
FIGS. 4A and 4B are diagrams explaining functions (software) of devices included in an information processing system.
Figure 4B:
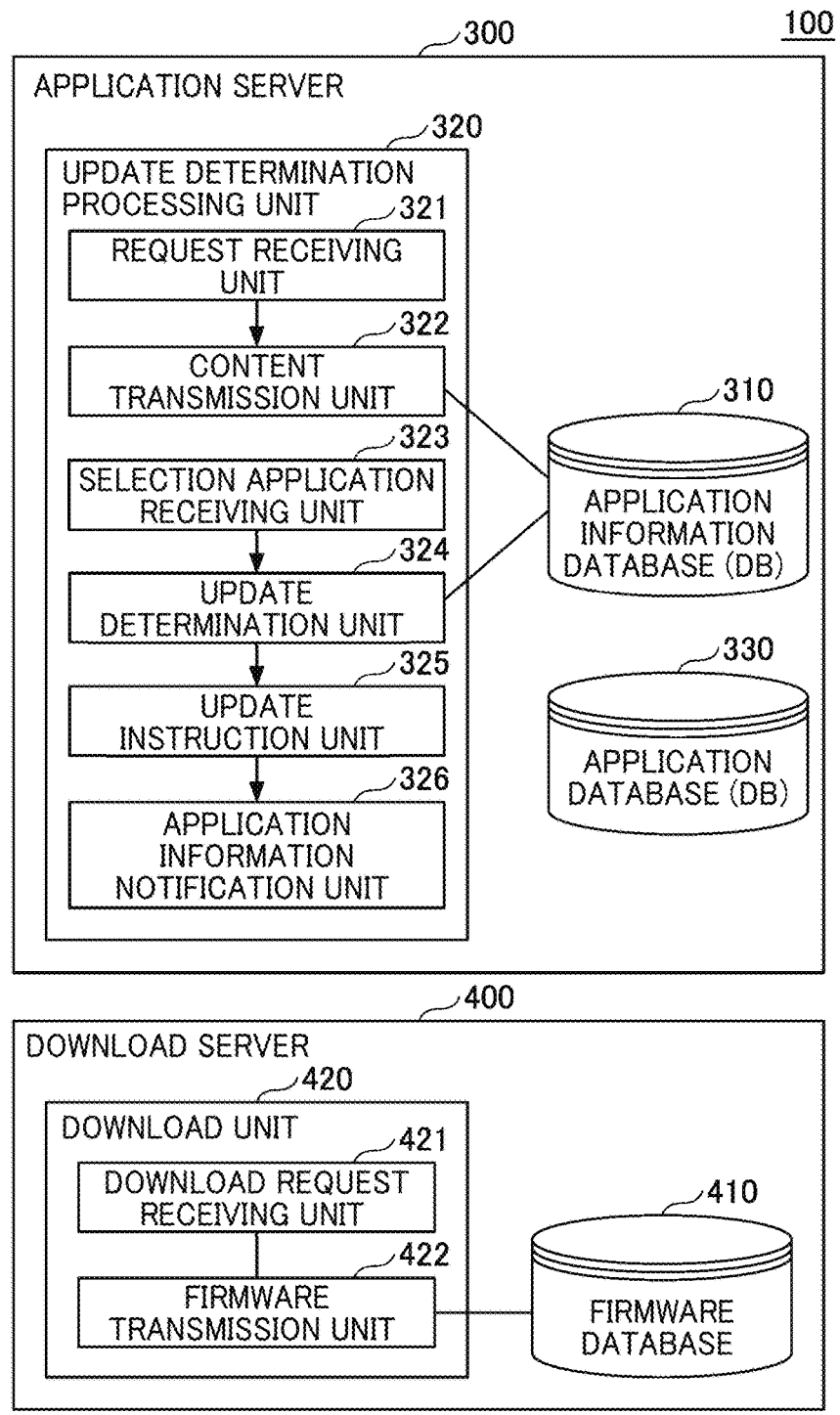

Next, with reference to FIG. 4, the function configuration of the respective devices included in the information processing system 100, in this embodiment will be described. FIG. 4 is a diagram for explaining the functions of the respective devices of the information processing system.

First, the function of the image forming apparatus 200 will be described.

The image forming apparatus 200 in the present embodiment has an application registration processing unit 210. The application registration processing unit 210 of the present embodiment is implemented by the control device 21 reading and executing the application registration program stored in the external storage device 25.

The application registration processing unit 210 in the present embodiment includes an input receiving unit 211, a display control unit 212, a content request unit 213, a content acquisition unit 214, a selected application notification unit 215, an update instruction reception unit 216, an update unit 217, a connection destination storing unit 218, an application registering unit 219, and a result notification unit 220. The application registration processing unit 210 can be or can include a web browser in the image forming apparatus 200.

The input receiving unit 211 receives an input to the image forming apparatus 200. Specifically, the input receiving unit 211 receives, for example, an operation instruction on the display operating device 22 by a user. The display control unit 212 controls the display on the display operation device 22. The plurality of units in the present embodiment are software program modules to make the processor or processing circuitry (for example, the processing unit 210) execute the respective processes.

The content requesting unit 213 requests to the application server 300 to acquire the content stored in the application server 300, in response to an operation accepted by the input receiving unit 211. The content requesting unit 213 in the present embodiment transmits the model information specifying the model of the image forming apparatus 200 to the application server 300 together with the request to acquire the content. Details of the model information will be described below.

The content acquisition unit 214 acquires the content provided from the application server 300. When the content is acquired by the content acquisition unit 214, the display control unit 212 can cause the display operation device 22 to display the acquired content. Specifically, the content acquisition unit 214 acquires, for example, a list of web applications provided from the application server 300 as content. In addition, the content acquisition unit 214 acquires attribute information as content. The attribute information indicates attributes of each web application. Further, the display control unit 212 can display a list of web applications based on the attribute information acquired from the application server 300. The details of the attribute information of the web application will be described below.

The selected application notification unit 215 notifies the selected web application in the image forming apparatus 200 to the application server 300. At this time, the selected application notification unit 215 can send the product ID of the selected web application to the application server 300. The product ID is included in the attribute information as an identifier (identification information) to specify the selected web application.

Further, the selected application notifying unit 215 can send the version information to the application server 300 together with the product ID. The version information indicates the version of the API (Application Programming Interface) of the image forming apparatus 200. The API of the image forming apparatus 200 is provided by the image forming apparatus 200 to control the engine to form an image from external apparatuses or the operation panel of the image forming apparatus 200. The API can be implement by a web server included in the image forming apparatus 200. In the following description, the version information indicating the version of API is simply referred to as version information.

The version information in the present embodiment can be pre-stored in the image forming apparatus 200 by the selected application notification unit 215 or can be acquired from the external storage device 25 or the like by the selected application notification unit 215. Details of the version information will be described below.

The update instruction receiving unit 216 receives an update instruction of the firmware of the image forming apparatus 200. The update instruction is notified from the application server 300.

The update unit 217 receives the update instruction and updates the firmware of the image forming apparatus 200. Specifically, the updating unit 217 requests to the download server 400 to download (transmit) the latest version of the firmware, downloads the latest version of the firmware, and installs the firmware in the image forming apparatus 200.

The connection destination storing unit 218 stores the URL (Uniform Resource Locator) of the connection destination from the image forming apparatus 200 when the image forming apparatus 200 is restarted, according to the update of the firmware. The connection destination is an address of the external server having the web application that the image forming apparatus 200 is connected to. Then, when the image forming apparatus 200 is restarted, the connection destination holding unit 218 connects to the held connection destination.

The application registration unit 219 registers the selected web application in the image forming apparatus 200. Specifically, the application registration unit 219 generates a shortcut icon to connect to the URL of the selected web application, sets the right to initiate the web application on the shortcut icon, and enables use of the web application by the user.

More specifically, after the shortcut icon is generated on a home screen (a screen having application icons) on the operation panel, when the operation panel of the image forming apparatus 200 receives an operation to select a shortcut icon by touching the icon from a user, the processor starts the web browser. Further, the web browser accesses a web application on the web identified by the URL included in the selected icon, and receives and displays the contents of the selected web application. Then, the image forming apparatus 200 including the web browser is enabled to use the web application or the functions implemented by the web application by the user. In other words the function provided by the web application is added to the image forming apparatus 200 by added icons of each of the web applications.

The result notifying unit 220 sends the result of the process (be registered or not) by the application registering unit 219 to the application server 300.

Next, the function configuration of the application server 300 in this embodiment will be described. The application server 300 includes an application information database (DB) 310, an update determination processing unit 320, and an application database (DB) 330.

The application information database 310 stores application information about each web application provided from the application server 300.

The application information is attribute information indicating attributes of the web application. The application information includes various kinds of information to enable use of the web application in the image forming apparatus 200. Details of the application information database 310 will be described below.

The application database 330 stores a web application provided to the image forming apparatus 200.

The update determination processing unit 320 determines whether or not the firmware in the image forming apparatus 200 needs to be updated.

The update determination processing unit 320 includes a request reception unit 321, a content transmission unit 322, a selection application reception unit 323, an update determination unit 324, an update instruction unit 325, and an application information notification unit 326.

The request receiving unit 321 receives a content acquisition request from the image forming apparatus 200. At this time, the request receiving unit 321 also accepts the model information of the image forming apparatus 200 together with the content acquisition request.

The content transmission unit 322 specifies and transmits the content to be transmitted, based on the model information received by the request receiving unit 321 together with the content acquisition request.

Here, the content transmitted to the image forming apparatus 200 is a list of web applications corresponding to the model information. The list of web applications can be provided to the image forming apparatus 200, for example, as a list of product IDs of web applications. Further, the list of web applications can be provided to the image forming apparatus 200 as a list of application information (attribute information) of the corresponding web application.

The selected application reception unit 323 receives notification of which web application is selected in the image forming apparatus 200. Specifically, the selected application receiving unit 323 receives notification of the product ID from the image forming apparatus 200. The product ID is ID information indicating the web application selected from the web application list on the image forming apparatus 200.

Further, the selected application reception unit 323 receives version information that is sent together with the product ID from the image forming apparatus 200.

The update determination unit 324 determines whether the firmware in the image forming apparatus needs to be updated, based on the application information stored in the application information database 310 and the version information received by the selected application receiving unit 323.

Specifically, the update determination unit 324 compares the application information including the product ID received by the selected application receiving unit 323 with the version information, and determines whether or not a firmware update is needed.

When the update determination unit 324 determines that the update is needed, the update instruction unit 325 instructs the image forming apparatus 200 to update the firmware.

The application information notifying unit 326 sends information to generate the shortcut icon for connecting to the URL of the selected web application to the image forming apparatus 200.

Further, the application server 300 in the present embodiment can have a database that stores application programs provided by the application server 300.

The download server 400 includes a firmware database 410 and a download unit 420.

The firmware database 410 stores the firmware of the image forming apparatus 200. The firmware stored in the firmware database 410 is at least the firmware of the latest version to be installed in the image forming apparatus 200

The download unit 420 includes a download request receiving unit 421 and a firmware transmission unit 422. The download request receiving unit 421 receives a download request of the firmware from the image forming apparatus 200. The firmware transmission unit 422 refers to the firmware database 410 and transmits the latest version of the firmware to be installed in the image forming apparatus 200 that made the download request.

Next, referring to FIG. 5, model information and version information will be described. Model information and version information are information that the content requesting unit 213 in the image forming apparatus 200 transmits to the application server 300 together with a content acquisition request. FIG. 5 is a diagram showing an example of device information.

In the present embodiment, the image forming apparatus 200, the application server 300, and the download server 400 are connected by using, for example, the HTTP (Hypertext Transfer Protocol) protocol.

The description 51 shown in FIG. 5 includes the model information and the version information of the image forming apparatus 200 in the HTTP header as the user agent information 52. In the following description, model information and version information of the image forming apparatus 200 are set as device information of the image forming apparatus 200.

In the present embodiment, the method of sending the device information of the image forming apparatus 200 to the application server 300 is not limited to the example shown in FIG. 5.

The device information can be acquired by using a Web API (Web Application Programming Interface) included in the image forming apparatus 200 or the web browser. Further, when the image forming apparatus 200 connects to the application server 300, the device information can be designated as a query parameter sent by the web browser or can be added to a URL for access to the application server 300 by the web browser.

Figure 6:
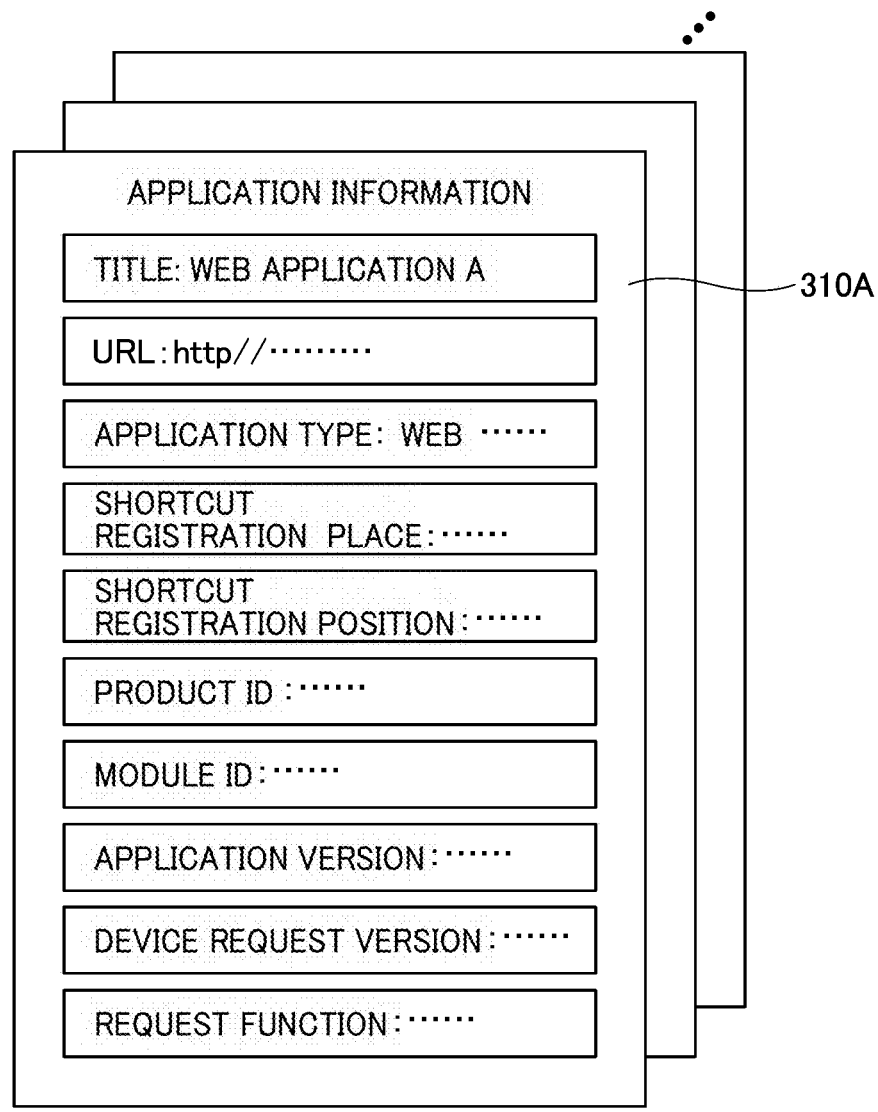
FIG. 6 is a diagram showing an example of an application information database.

Next, with reference to FIG. 6, the application information stored in the application information database 310 in this embodiment will be described. FIG. 6 is a diagram showing an example of the application information database.

The application information database 310 stores application information of each web application. FIG. 6 shows the application information 310A of the web application A as an example.

The application information 310A in the present embodiment has information such as the title, URL, application type, shortcut registration place, shortcut registration position, product ID, module ID, application version, device request version, and request function as items of information. In the application information 310A, the item "product ID" is associated with other items. In the following description, information including the values of these items is called application information.

The application information in the present embodiment is information referred to in the application server so as to enable use of the web application A by the image forming apparatus 200. Moreover, the application information is attribute information indicating an attribute of the web application.

The value of the item "title" indicates the name of the web application. The value of the item "URL" indicates the URL of the web application A. The value of the item "application type" indicates the type of application. The value of the item "shortcut registration location" indicates the storage location of the shortcut icon. The value of the item "shortcut registration position" indicates the display position of the shortcut icon. The value of the item "product ID" indicates the identifier (identification information) of the web application A.

The value of the item "module ID" indicates an identifier (identification information) for specifying the module including the web application A. The value of the item "application version" indicates the version of the web application A. The value of the item "device request version" indicates the version of the image forming apparatus 200 needed to use the web application A. Specially, the value of the "device request version" is the API version of image forming apparatus. The value of the item "requested function" indicates a function required by the image forming apparatus 200 in order to use the function provided by the web application A by the image forming apparatus 200.

In the application information 310A, the values of the items "title", "URL", "application type", "shortcut registration place", and "shortcut registration position" are information referred to generate the shortcut icon. In the following description, the values of these items are referred to as icon generation information.

Further, in the application information 310A, the values of the items "product ID", "module ID", and "application version" are information for specifying the web application A. In the following description, the values of these items are called application specific information.

Further, in the application information 310A, the values of the items "device request version" and "request function" are information indicating the specifications of the image forming apparatus 200 to be satisfied for implementing the function of the web application A on the image forming apparatus 200. In the following description, the values of these items are referred to as specification information. In other words, the specification information of the present embodiment is information indicating the specification required in the image forming apparatus 200 when the web application A uses the function of the image forming apparatus 200.

In the present embodiment, when the specification information is not included in the application information 310A, the web application A does not use the function of the image forming apparatus 200. Therefore, it is not necessary to determine whether or not updating of the firmware is needed, when the specification information is not included in the application information.

Next, with reference to FIGS. 7A and 7B, the operation of the image forming apparatus 200 of this embodiment will be described. FIGS. 7A and 7B are flowcharts for explaining the operation of the image forming apparatus.

The application registration processing unit 210 of the image forming apparatus 200 determines whether or not the input reception unit 211 has received a request to display a list of web applications by a user on the image forming apparatus 200 (step S701). In step S701, if a display request is not accepted, the application registration processing unit stands by until a display request is accepted.

When accepting the display request in step S701, the application registration processing unit 210 transmits the content acquisition request and the model information indicating the model of the image forming apparatus 200 to the application server 300 by using the content requesting unit 213 (Step S702). Subsequently, the application registration processing unit 210 acquires content indicating the list of web applications from the application server 300 by using the content acquisition unit 214, and causes the display control unit 212 to display the list on the display operation device 22 (step S703).

Next, the application registration processing unit 210 determines whether or not selection of a web application has been accepted by using the input receiving unit 211 (step S704). In step S704, if selection of a web application is not accepted, the application registration processing unit 210 waits until receiving a selection.

In step S704, when accepting the selection of the web application, the application registration processing unit 210 causes the selected application notification unit 215 to transmit the version information of the image forming apparatus 200 and the product ID of the selected web application to the application server 300 (Step S705).

Subsequently, the application registration processing unit 210 determines whether or not an instruction to update the firmware has been received from the application server 300 by using the update instruction receiving unit 216 (step S706). In step S706, if the update instruction is not accepted, the application registration processing unit 210 proceeds to step S713 to be described below. Further, in the case that the update instruction is not accepted in step S706, it is determined that updating of the firmware is not necessary in the application server 300.

In step S706, when the image forming apparatus 200 receives the update instruction, the application registration processing unit 210 requests the download server 400 to download the firmware by using the updating unit 217 (step S707). At this time, the updating unit 217 can transmit the model information of the image forming apparatus 200 to the download server 400 together with the download request.

Subsequently, the updating unit 217 downloads the firmware of the latest version corresponding to the web application selected on the image forming apparatus 200, from the download server 400. Next, the updating unit 217 installs the downloaded firmware in the image forming apparatus 200, and updates the firmware (step S708).

Subsequently, the application registration processing unit 210 stores the URL of the connection destination to the application server 300 and/or download server 400 by using the connection destination holding unit 218 (step S709). Subsequently, the application registration processing unit 210 restarts the image forming apparatus 200 (step S710). Subsequently, the application registration processing unit 210 connects the image forming apparatus 200 to the URL stored by the connection destination holding unit 218 (step S711). The application registration processing unit 210 can initiate the web application, based on the selection of the shortcut icon by the user, and execute at least one image forming function of the image forming apparatus by using the web application, after step S711.

As described above, in this embodiment, when the image forming apparatus 200 is restarted in updating the firmware, the image forming apparatus 200 holds the URL of the connection destination before the restart. Thus, it is possible to display the screen that had been displayed before the image forming apparatus 200 restarted.

Subsequently, the application registration processing unit 210 sends the completion of the firmware update to the application server 300 by using the result notification unit 220 (step S712).

Next, the application registration processing unit 210 acquires icon generation information from the application server 300 by using the application registration unit 219 (step S713). When the application information is included in the content acquired by the content acquisition unit 214, the application acquisition unit 219 can extract the icon generation information from the content including the application information of the selected web application.

Subsequently, the application registration unit 219 generates a shortcut icon to connect to the selected web application based on the icon generation information. Further, the application registration unit 219 causes the display control device 212 to display the shortcut icon (step S714). Details about the generation of the shortcut icon by the application registration unit 219 will be described below.

Subsequently, the application registration processing unit 210 sends the notification of the registration completion of the web application to the application server 300 by using the result notification unit 220 (step S715). Subsequently, the application registration processing unit 210 causes the display control unit 212 to display a notification indicating that registration of the web application has been completed on the display operation device 22 (step S716), and ends the processing.

In the process shown in FIGS. 7A and 7B, if any error occurs, it can be notified in step S716 that an error has occurred. The error can be, for example, a case that the firmware update is not performed normally, or a case that the shortcut icon generation is not performed normally. Further, the displaying error notification can include information indicating the content of the error.

Figure 8B:
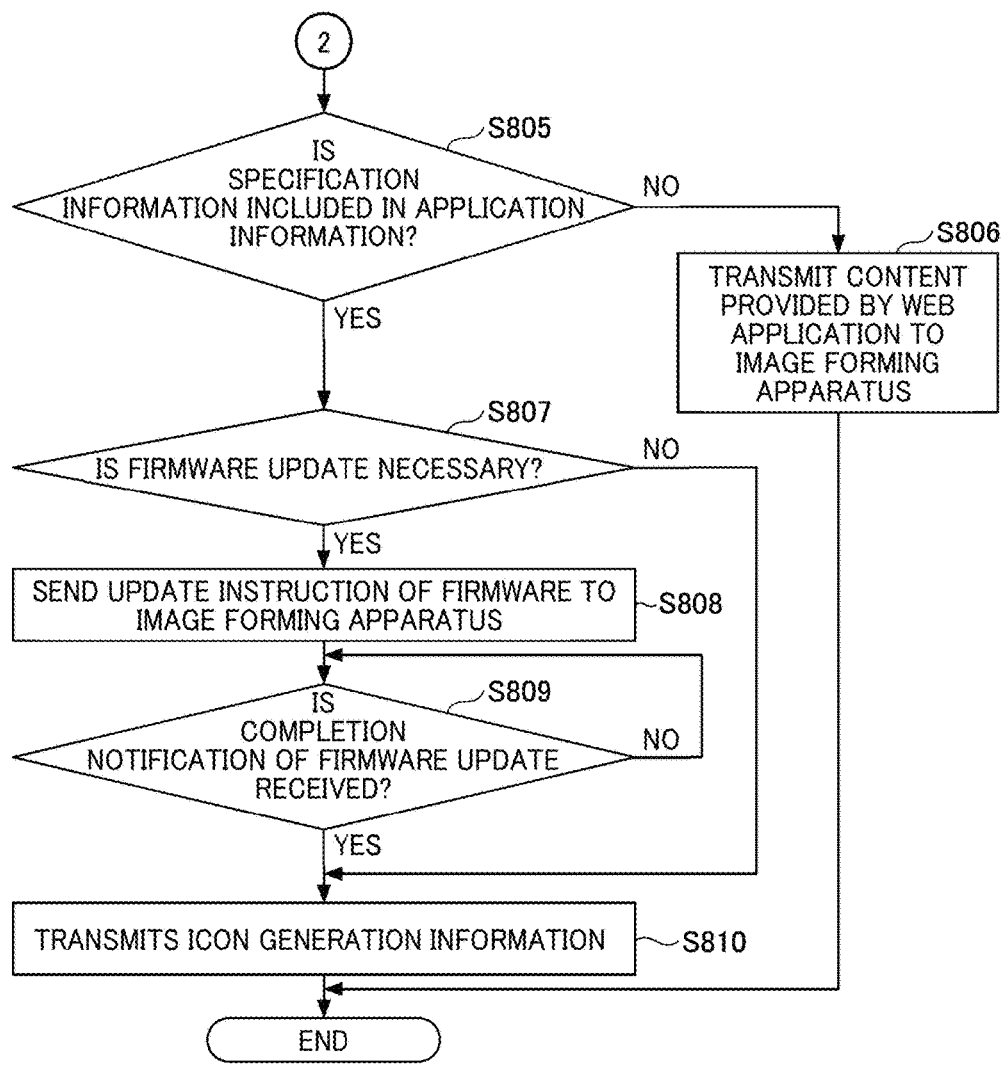

Next, with reference to FIGS. 8A and 8B, the operation of the application server 300 in this embodiment will be described. FIGS. 8A and 8B are flowcharts for explaining the operation of the application server.

The update determination processing unit 320 included in the application server 300 determines whether or not a content acquisition request has been accepted by the request reception unit 321 (step S801). In step S801, if the acquisition request is not accepted, the update determination processing unit 320 waits until an acquisition request is accepted.

In step S801, when receiving an acquisition request, the update determination processing unit 320 refers to the application information database 310 by using the content transmission unit 322 and specifies at least one web application whose model information matches the model information received together with the acquisition request.

Next, the content transmission unit 322 transmits the specified list of web applications to the image forming apparatus 200 (step S802).

In the present embodiment, a part of the application information of the specified web application can be transmitted to the image forming apparatus 200 as a list of web applications. For example, the product ID included in the application information of the identified web application can be transmitted as a list of web applications. Further, in the present embodiment, application information of each specified web application can be transmitted to the image forming apparatus 200 as content. In this case, the processing of the update determination unit 324 described below can be executed in the image forming apparatus 200.

Subsequently, the update determination processing unit 320 determines whether or not the product ID of the selected web application and the version information of the image forming apparatus 200 is received from the image forming apparatus 200 using the selected application unit 323 (Step S803). In step S803, if the information is not received, the selected application receiving unit 323 waits until the information is received.

In step S803, when receiving the product ID and the version information, the update determination processing unit 320 refers to the application information in the application information database 310. The application information to be referred to is that whose product ID matches the product ID of selected web application, by using the update determination unit 324 (step S804).

Subsequently, the update determining unit 324 determines whether or not specification information is included in the referred to application information (step S805). In step S805, if the specification information is not included, the update determination processing unit 320 transmits the content provided by the web application specified by the product ID to the image forming apparatus 200 (step S806), and ends the processing.

In step S805, if the specification information is included, the update determination unit 324 determines whether a firmware update is necessary (step S807). Specifically, the update determining unit 324 compares the version information included in the referred to application information with the version information received by the selected application receiving unit 323. When the version information included in the application information is a version newer than the received version information, the update determination unit 324 determines that the firmware update is necessary.

In other words, the update determination unit 324 determines whether or not the image forming apparatus 200 satisfies specifications required by the web application specified by the product ID. Then, when the image forming apparatus 200 does not satisfy the specification requested by the web application, the update determination unit 324 determines that the firmware update of the image forming apparatus 200 is necessary. When the image forming apparatus 200 determines that the specification requested by the web application is satisfied, the update determination unit 324 determines that the firmware update of the image forming apparatus 200 is not needed.

In step S807, when it is determined that the firmware update is not needed, the update determination processing unit 320 proceeds to step S810 described below.

In step S807, if it is determined that firmware update is necessary, the update determination processing unit 320 sends an update instruction of the firmware to the image forming apparatus 200 by using the update instruction unit 325 (step S808).

Subsequently, the update determination processing unit 320 determines whether or not a completion notification of the firmware update from the image forming apparatus 200 is received by the application information notification unit 326 (step S809). In step S809, in case completion notification of the firmware update is not accepted, the update determination processing unit 320 waits until receiving notification completion of the firmware update.

In step S809, when the completion notification of the firmware update is received, the update determination processing unit 320 transmits the icon generation information included in the application information referred to in step S804, to the image forming apparatus 200 by the application information notification unit 326 (Step S810). Next, the update determination processing unit 320 ends the processing.

As described above, in the application server 300 in the present embodiment, it is necessary to determine whether or not the firmware update is required only when the specification information of the image forming apparatus 200 is included in the application information of the selected web application.

Next, with reference to FIGS. 9A and 9B, as an example of the whole operation of the information processing system 100, the firmware update operation of the image forming apparatus 200 in the information processing system 100 will be described.

Figure 9A:
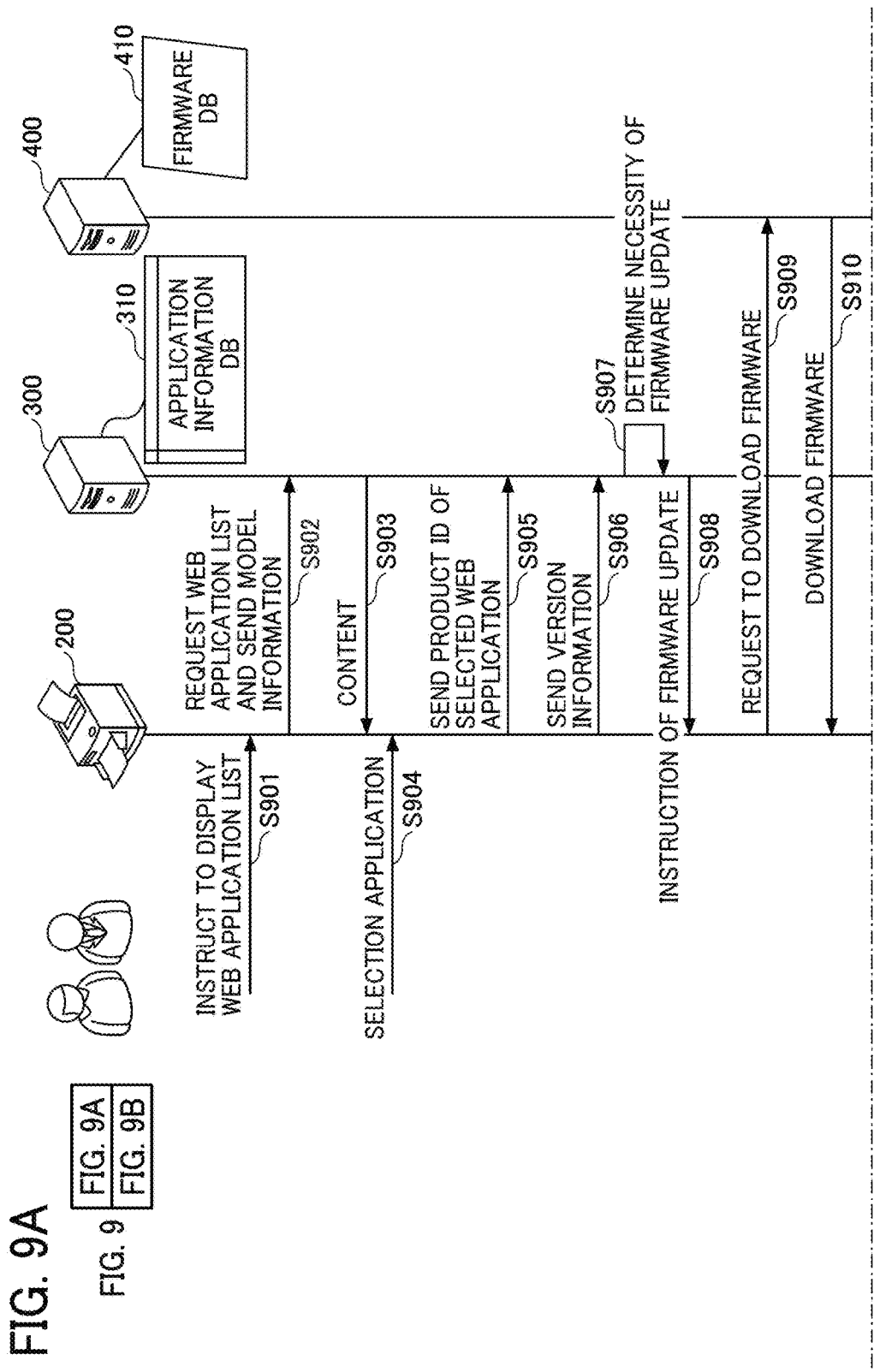
FIGS. 9A and 9B are sequence diagrams illustrating the operation of the information processing system.
Figure 9B:
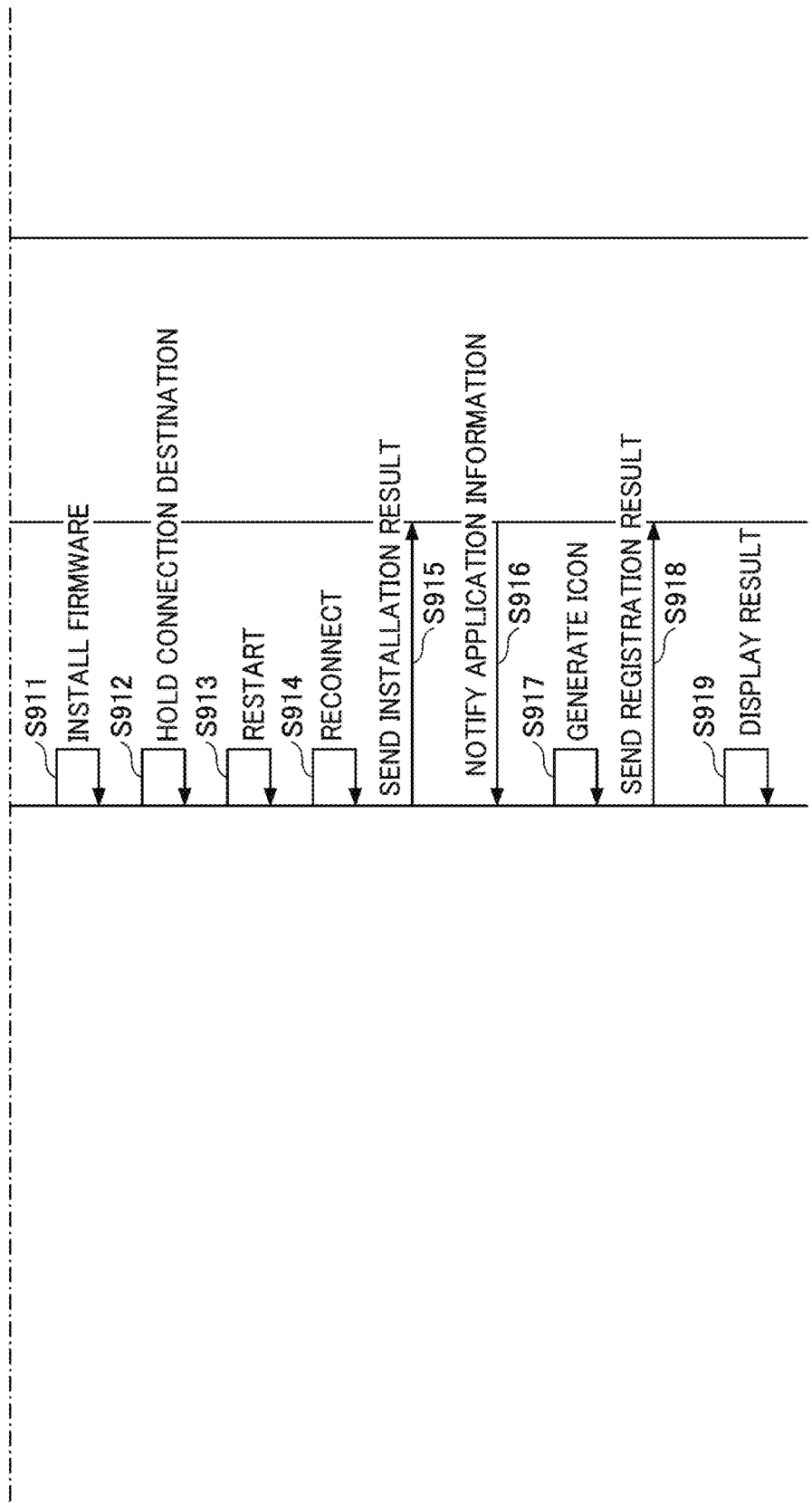

FIGS. 9A and 9B are sequence diagrams explaining the operation of the information processing system.

In the information processing system 100 of the present embodiment, when the image forming apparatus 200 receives a request to display a list of web applications (step S901), the web browser in the image forming apparatus 200 sends a request to acquire a list of at least one web application and model information of an image forming apparatus 200 to the application server 300 (step S902).

The application server 300 transmits, in response to the acquisition request, the content indicating the list of the web applications corresponding to the model information to the image forming apparatus 200 (step S903).

The image forming apparatus 200 displays the content indicating the list of the web applications and accepts the input by the user to select the web application in the web application list (step S904). In response to receiving the selection of the web application, the image forming apparatus 200 transmits the product ID of the selected web application and the version information of the image forming apparatus 200 to the application server 300 (steps S905, S906).

In the example of FIGS. 9A and 9B, the application information that matches the product ID in the application information DB 310 can include specification information. Therefore, the application server 300 determines whether to update the firmware based on the specification information included in the application information and the version information (step S907). In the example of FIGS. 9A and 9B, the version indicated by the version information is older than the version indicated by the value of the item "device request version" included in the specification information.

Then, in step S907, the application server 300 determines that the firmware update is to be performed, and sends an instruction to the image forming apparatus 200 to update the firmware (step S908).

According to the update instruction, the image forming apparatus 200 requests to download the latest version of the firmware to the download server 400 (step S909), and downloads the corresponding firmware (step S910).

Subsequently, the image forming apparatus 200 installs the downloaded firmware (step S911), and holds the URL of the connection destination (step S912).

Since the processing from step S912 to step S919 in FIG. 9B is the same as the processing from step S709 to step S715 in FIG. 7B, the description is omitted.

As described above, according to the present embodiment, for example, when a web application is added in the image forming apparatus 200, the image forming apparatus 200 can automatically update the firmware, even if the version information in the image forming apparatus 200 is older than the version required by the web application to be used by the image forming apparatus 200. Therefore, according to the present embodiment, it is possible to easily construct the firmware in the image forming apparatus 200 relating to the web application to be registered in the image forming apparatus 200. Further, it is possible to prevent the possibility that the web application cannot be used due to the older version of the firmware, or that a malfunction of the image forming apparatus 200 occurs due to the use of the web application, after the web application is registered in the image forming apparatus 200.

Next, with reference to FIGS. 10 to 12, a display example of the display operation device 22 of the image forming apparatus 200 will be described below.

Figure 10:
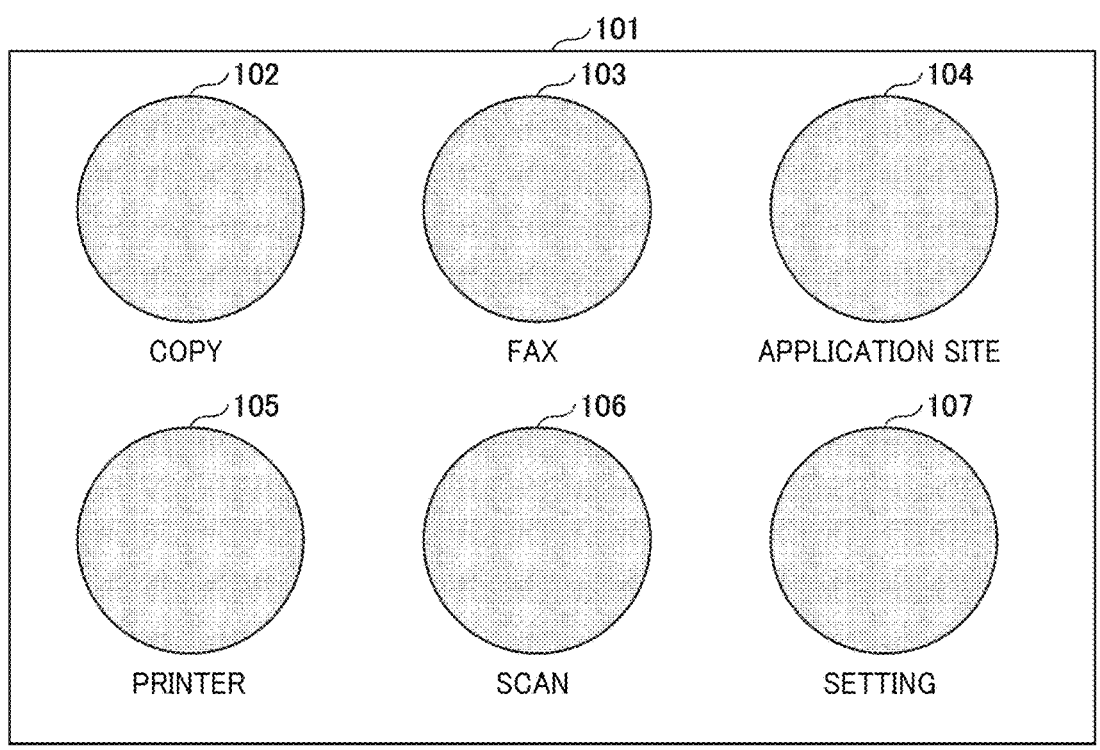
FIG. 10 is a diagram showing an example of a screen for requesting acquisition of a list of web applications.

FIG. 10 is a diagram showing an example of a screen to request to acquire the list of web applications. The screen 101 shown in FIG. 10 is an example of a home screen of the image forming apparatus 200.

On the screen 101, screen parts for user operations 102 to 107 are displayed. The screen parts are icons corresponding to the software application (function) included in the image forming apparatus 200.

For example, the screen part 102 is for instructing to execute start of an application that implements the copy function. The screen part 103 is for instructing to execute start of an application that implements a facsimile function. The screen part 104 is for instructing to execute start of the web browser and causes the web browser to acquire and display the list of web applications in response to being touched by the user.

The screen part 105 instructs execution of an application that realizes a printer function. The screen part 106 is for instructing execution of an application that realizes the scan function. The screen part 106 instructs execution of an application that realizes the initial setting function.

In the present embodiment, when the screen part 104 is operated on the screen 101 by the user, the application registration processing unit 210 issues a content acquisition request to the application server 300.

Figure 11:
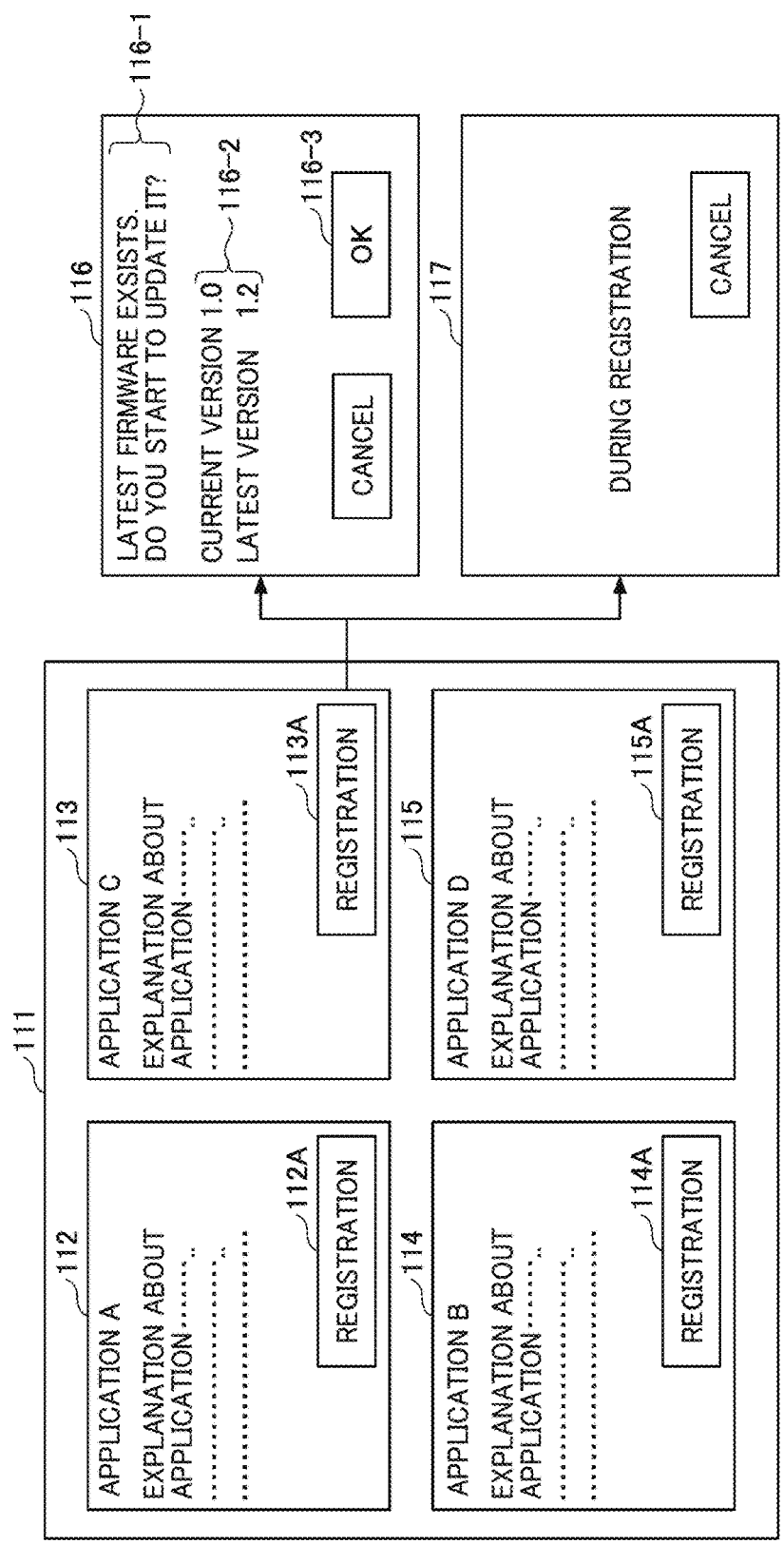
FIG. 11 is a diagram showing an example of a screen on which a list of web applications is displayed.

FIG. 11 is a diagram showing an example of a screen that includes a list of native applications and web applications. A screen 111 shown in FIG. 11 is an example of a list screen that is transmitted from the application server 300 as the content.

In the screen 111 shown in FIG. 11, web applications A, B, C, and D are extracted corresponding to the model of the image forming apparatus 200 that sent the model information, and a list of the extracted web applications is displayed. Further, on the screen 111, for each web application, an explanation of a function implemented by the web application and a screen part for selecting the web application are displayed.

On the screen 111, an explanation of the web application A and the operation component (button) 112A for allowing the user to register or select the web application A to be registered are displayed in a display area 112. Further, display areas 113, 114, and 115 also have an explanation of the web applications B, C, and D and the operation components (buttons) 113A, 114A, and 115A, respectively.

In the present embodiment, when an operation component (button) for selecting a web application is operated on the screen 111 and a firmware update determination is made, the screen 111 transitions to a screen showing the determination result.

A screen 116 shown in FIG. 11 is an example of a display when the operation component 113A is operated on the screen 111 and it is determined that the firmware update is necessary.

The screen 116 displays a notification 116-1 indicating that the firmware update is necessary, and information 116-2 indicating the version requested by the web application C and the current version of the image forming apparatus 200. When the operation component (button) 116-3 is operated on the screen 116, the image forming apparatus 200 transmits a download request of the latest version of the firmware to the application server 300 and updates the firmware.

A screen 117 shown in FIG. 11 is an example of the display when the operation component 113A is operated on the screen 111 and it is determined that updating of the firmware is unnecessary.

In this case, the image forming apparatus 200 acquires icon generation information from the application server 300 and generates a shortcut icon.

Figure 12:
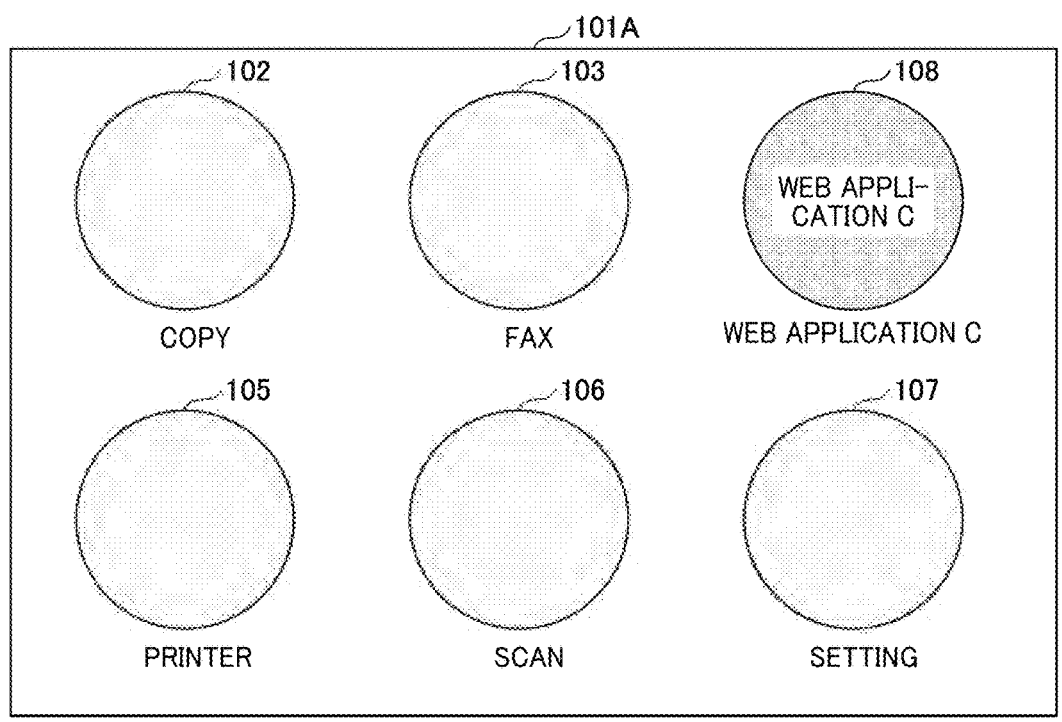
FIG. 12 is a diagram showing an example of a screen on which a shortcut icon of a web application is generated.

FIG. 12 is a diagram showing an example of a home screen in which a shortcut icon of a web application is generated and displayed.

On the screen 101A shown in FIG. 12, the screen parts (icons of native applications) 102, 103, 105, 106, and 107 and the shortcut icon 108 are displayed.

The shortcut icon 108 in the present embodiment is an icon generated based on the icon generation information acquired by the application registration unit 219.

Specifically, the application registration unit 219 registers and displays the icon having the item "title" included in the icon generation information as the icon name.

The shortcut icon 108 in the present embodiment is an icon generated based on the icon generation information acquired by the application registration unit 219.

Specifically, the application registration unit 219 registers and displays the icon having the item "title" included in the icon generation information as the icon name. Further, the application registration unit 219 associates or sets the value of the item "URL" in the shortcut icon 108 so as to connect to the URL by using the web browser when the shortcut icon 108 is touched by user. As a result, the web browser in the image forming apparatus 200 communicates to the associated URL indicating the external server included in the web application as the connection destination when the shortcut icon 108 is selected.

Also, the application registration unit 219 displays the shortcut icon 108 at the position where the operation component 104 in the home screen 101A on the operation panel was displayed, based on the value of the item "shortcut registration place" and the value of the item "shortcut icon registration position."

Further, the application registration unit 219 sets authority for initiating the web application C on the shortcut icon 108. In the present embodiment, by setting this authority on the shortcut icon 108, it is possible to use the function of the web application C by operating the shortcut icon 108.

Further, in the present embodiment, an icon image to be displayed as the shortcut icon 108 can be settable or changeable. In this case, the image forming apparatus 200 can cause another image selected by user to be associated with the shortcut icon 108 to be displayed as the shortcut icon 108 after the shortcut icon 108 is generated.

Further, in the example of FIG. 12, the value of the item "shortcut registration place" is "home screen" on the operation panel, but if the value of the item "shortcut registration place" is "bookmark" or the like, the shortcut icon 108 is stored in the bookmark list as one bookmark (a favorite URL).

As described above, by the present embodiment, the image forming apparatus 200 is able to add the function provided by the web application. Further, the image forming apparatus 200 can easily update the firmware before registering the web application (the icon), and can avoid malfunction of the image forming apparatus 200 or inconvenience in not being able to use the web application by the image forming apparatus 200.

In the present embodiment, the application server 300 is configured to have the application information database (DB) 310 and the update determination processing unit 320, but the update determination processing unit 320 can be included in the image forming apparatus 200.

In this case, the image forming apparatus 200 acquires content that includes a web application list by referring to the application information database (DB) 310, in response to receiving the request to acquire the list of web applications. Further, when the image forming apparatus 200 is received, the input to select the web application on the list, the image forming apparatus 200 acquires the application information of the selected web application from the application information database (DB) 310 and executes the determination by the update determination processing unit 320 in the image forming apparatus 200.

Although the embodiments of the present disclosure have been described in detail above, the present disclosure is not limited to such specific embodiments and variations and modifications may be made without departing from the scope of the present disclosure.

The invention claimed is:

1. An information processing system, comprising:
   a server including
      a memory to store application information of at least one web application; and
      first circuitry configured to
         receive device information of an image forming apparatus and an identifier identifying a selection by a user of a specific web application from the image forming apparatus,
         compare the received device information of the image forming apparatus with application information of the selected web application, the application information being obtained from the memory,
         determine whether an update of firmware of the image forming apparatus is necessary, based on a result of the comparison, and send, to the image forming apparatus, an instruction to update the firmware of the image forming apparatus, when a result of the determination indicates that the update of the firmware is necessary;

the image forming apparatus, wherein the image forming apparatus includes
second circuitry configured to
receive the selection of the specific web application by the user,
receive the instruction to update the firmware,
update the firmware of the image forming apparatus in response to receiving the instruction,
generate a shortcut icon of the selected web application after the firmware is updated, and
execute the selected web application that required the update of the firmware of the image forming apparatus, by using the shortcut icon; and
a web browser configured to
request, from the server, a list of the at least one web application,
display the list of the at least one web application,
receive input of the selection of the specific web application,
send, to the server, a product identifier of the selected web application and current version information of the firmware of the image forming apparatus,
receive, from the server, the instruction to update the firmware when the current version information is older than a latest version information,
register the shortcut icon after completing the firmware update,
initiate the selected web application based on selection of the shortcut icon by the user, and
execute at least one image forming function of the image forming apparatus by using the selected web application.

2. The server of claim 1, wherein
the application information includes first version information indicating a version of the firmware required to execute the specific web application on the image forming apparatus,
the device information includes second version information indicating a current version of firmware of the image forming apparatus, and
the first circuitry is further configured to compare the first version information and the second version information.

3. The server of claim 2, wherein
the first circuitry is further configured to determine that it is not necessary to update the firmware when the application information does not include specification information, and
the specification information includes the first version information and information indicating a function required in the image forming apparatus to be executed by the selected web application.

4. The information processing system according to claim 1, wherein the second circuitry is further configured to:
generate the shortcut icon that initiates the web application after the firmware update, and
cause an operation panel to display the shortcut icon.

5. The information processing system according to claim 4, wherein the application information includes display position information of the shortcut icon on a screen of the operation panel.

6. The information processing system according to claim 4, wherein the application information includes storage location information of an image of the shortcut icon.

7. An information processing method performed by an information processing system having an image forming apparatus and a server that provides application information of at least one web application to the image forming apparatus, the method comprising:
storing the application information of the web application;
receiving selection of a specific web application by a user;
receiving device information of the image forming apparatus;
comparing the received device information of the image forming apparatus with application information of the selected web application;
determining whether an update of firmware of the image forming apparatus is necessary based on a result of the comparison;
updating the firmware of the image forming apparatus when a result of the determination indicates that the update of the firmware is necessary;
generating a shortcut icon of the selected web application after the firmware is updated; and
executing the selected web application, which required the update of the firmware of the image forming apparatus, by using the shortcut icon,
and
a web browser of the image forming apparatus performing the steps of
requesting, from the server, a list of the at least one web application,
displaying the list of the at least one web application,
receiving input of the selection of the specific web application,
sending, to the server, a product identifier of the selected web application and current version information of the firmware of the image forming apparatus,
receiving, from the server, an instruction to update the firmware when the current version information is older than a latest version information,
registering the shortcut icon after completing the firmware update,
initiating the selected web application based on selection of the shortcut icon by the user, and
executing at least one image forming function of the image forming apparatus by using the selected web application.

8. An information processing system including an electronic device and a server that provides application information of at least one web application to the electronic device, the information processing system comprising:
a memory, included in the server, to store the application information of the web application;
circuitry configured to
receive selection of a specific web application by a user,
receive device information of the electronic device,
compare the received device information of the electronic device with application information of the selected web application,
determine whether an update of firmware of the electronic device is necessary based on a result of the comparison,
update the firmware of the electronic device when a result of the determination indicates that the update of the firmware is necessary, generate a shortcut icon of the selected web application after the firmware is updated, and execute the selected web application, which required the update of the firmware of the electronic device, by using the shortcut icon;

and a web browser configured to request, from the server, a list of the at least one web application, display the list of the at least one web application, receive input of the selection of the specific web application, send, to the server, a product identifier of the selected web application and current version information of the firmware of the electronic device, receive, from the server, an instruction to update the firmware when the current version information is older than a latest version information, register the shortcut icon after completing the firmware update, initiate the selected web application based on selection of the shortcut icon by the user, and execute at least one image forming function of the electronic device by using the selected web application.

* * * * *